(12) United States Patent
Totoki

(10) Patent No.: US 9,380,259 B2
(45) Date of Patent: Jun. 28, 2016

(54) INFORMATION PROCESSING DEVICE AND INFORMATION PROCESSING METHOD

(71) Applicant: FUJITSU LIMITED, Kawasaki-shi, Kanagawa (JP)

(72) Inventor: Shin Totoki, Fukuoka (JP)

(73) Assignee: FUJITSU LIMITED, Kawasaki (JP)

( * ) Notice: Subject to any disclaimer, the term of this patent is extended or adjusted under 35 U.S.C. 154(b) by 223 days.

(21) Appl. No.: 13/671,625

(22) Filed: Nov. 8, 2012

(65) Prior Publication Data

US 2013/0163958 A1 Jun. 27, 2013

(30) Foreign Application Priority Data

Dec. 22, 2011 (JP) .................................. 2011-282403

(51) Int. Cl.
| | |
|---|---|
| *H04N 9/80* | (2006.01) |
| *G11B 27/00* | (2006.01) |
| *H04N 5/93* | (2006.01) |
| *H04N 5/91* | (2006.01) |
| *G11B 27/034* | (2006.01) |
| *H04N 21/432* | (2011.01) |
| *H04N 21/84* | (2011.01) |
| *H04N 21/845* | (2011.01) |
| *H04N 9/82* | (2006.01) |

(52) U.S. Cl.
CPC ............. *H04N 5/91* (2013.01); *G11B 27/034* (2013.01); *H04N 21/4325* (2013.01); *H04N 21/84* (2013.01); *H04N 21/8455* (2013.01); *H04N 9/8205* (2013.01)

(58) Field of Classification Search
USPC .................................. 386/239–248, 278–290
See application file for complete search history.

(56) References Cited

U.S. PATENT DOCUMENTS

| | | | |
|---|---|---|---|
| 5,970,504 | A | 10/1999 | Abe et al. |
| 6,144,972 | A | 11/2000 | Abe et al. |
| 6,363,115 | B1 | 3/2002 | Doux |
| 6,462,754 | B1 | 10/2002 | Chakraborty et al. |
| 2002/0031181 | A1 | 3/2002 | Doux |
| 2002/0064378 | A1* | 5/2002 | Seto .............................. 386/111 |

(Continued)

FOREIGN PATENT DOCUMENTS

| | | |
|---|---|---|
| CN | 1249881 | 4/2000 |
| CN | 1360699 | 7/2002 |

(Continued)

OTHER PUBLICATIONS

Patent Abstracts of Japan, Publication No. 08-123816, Published May 17, 1996.

(Continued)

*Primary Examiner* — Hung Dang
(74) *Attorney, Agent, or Firm* — Staas & Halsey LLP

(57) ABSTRACT

A non-transitory computer-readable recording medium storing a program that causes a computer to execute a process including receiving a setting of an anchor to a subject in an image included in a video; determining whether a movement amount between the subject to which the anchor has been set in a predetermined image in the video and the subject in another image included in the video is greater than or equal to a predetermined value; and storing, in a storage unit, an identifier of the another image that is a determination target, and position information of the anchor, when the movement amount is determined to be greater than or equal to the predetermined value.

9 Claims, 15 Drawing Sheets

(56) References Cited

U.S. PATENT DOCUMENTS

| | | | |
|---|---|---|---|
| 2005/0046699 A1* | 3/2005 | Oya et al. | 348/207.1 |
| 2006/0061598 A1* | 3/2006 | Mino et al. | 345/629 |
| 2011/0193941 A1* | 8/2011 | Inaba et al. | 348/46 |
| 2012/0008915 A1* | 1/2012 | Takahashi et al. | 386/240 |
| 2012/0128241 A1* | 5/2012 | Jung | 382/165 |

FOREIGN PATENT DOCUMENTS

| | | | | |
|---|---|---|---|---|
| JP | 8-123816 | 5/1996 | | |
| JP | 10-187759 | 7/1998 | | |
| JP | 2006-246175 | 9/2006 | | |
| WO | WO 2010/021527 A2 * | 2/2010 | | H04N 7/173 |
| WO | WO 2010/113666 A1 * | 7/2010 | | H04N 5/93 |

OTHER PUBLICATIONS

Chinese Office Action dated Apr. 24, 2015 in corresponding Chinese Patent Application No. 201210519494.5.

H. Abe et al., "An Implementation of Video Hypermedia Using Motion Picture Analysis," *Technical Report of IEICE*, vol. 95, No. 582, Japan, The Institute of Electronics, Information and Communication Engineers (IEICE), Mar. 15, 1996, IE95-151, PRU95-238, pp. 21-26 with cover p. 3.

Office Action mailed Jul. 21, 2015 for corresponding Japanese Patent Application No. 2011-282403.

Patent Abstracts of Japan, Publication No. 10-187759, Published Jul. 21, 1998.

Patent Abstracts of Japan, Publication No. 2006-246175, Published Sep. 14, 2006.

* cited by examiner

FIG.2

| DATA NAME | HIERARCHAL STRUCTURE | PURPOSE |
|---|---|---|
| name | — | ANCHOR IDENTIFICATION NAME |
| type | — | ANCHOR TYPE (ICON OR LINK TYPE) |
| size | — | ANCHOR AREA (SIZE OF CLICK RANGE) |
| link | — | LINK DESTINATION INFORMATION |
| data | time | FOR SYNCHRONIZING WITH VIDEO DATA: FRAME POSITION OR ELAPSED TIME |
| | px | X COORDINATE ON VIDEO IMAGE (VIDEO ORIGINAL SIZE STANDARD) |
| | py | Y COORDINATE ON VIDEO IMAGE (VIDEO ORIGINAL SIZE STANDARD) |

FIG.3

```
<Anchor name="sampleA" type="LINK" size="60" link="nextset" >
    <data time="9500" x="753" y="292" />
    <data time="9900" x="723" y="275" />
    <data time="12900" x="562" y="278" />
    <data time="14300" x="584" y="269" />
</Anchor>
```

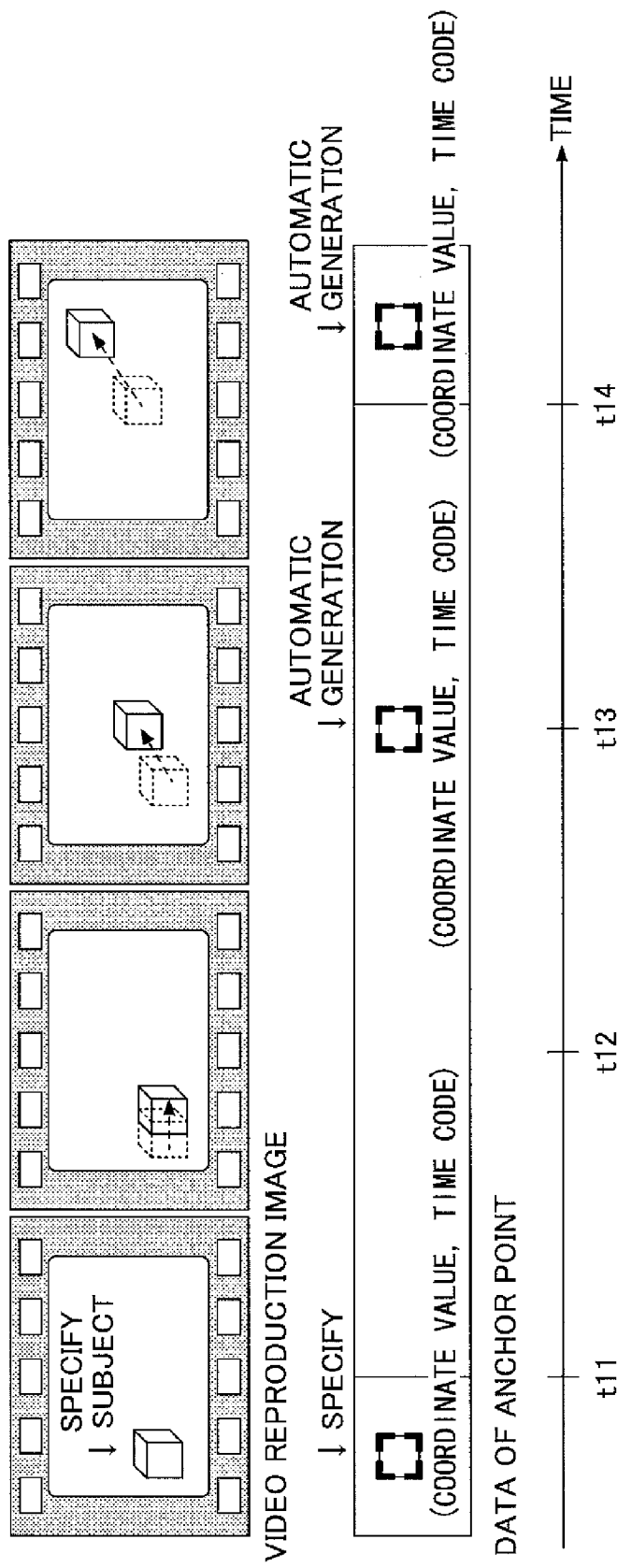

INFORMATION PROCESSING DEVICE AND INFORMATION PROCESSING METHOD

CROSS-REFERENCE TO RELATED APPLICATION

This patent application is based upon and claims the benefit of priority of the prior Japanese Patent Application No. 2011-282403 filed on Dec. 22, 2011, the entire contents of which are incorporated herein by reference.

FIELD

The embodiments discussed herein are related to an information processing device and an information processing method.

BACKGROUND

Conventionally, there is known a method of performing a link operation in a hyper-media environment using videos, where an anchor is displayed on a subject of the video, a link is tied to the anchor, and the anchor is specified in the video. In the following, the subject is also referred to as an object.

For example, there is a technology of setting an anchor in an arbitrary area moving in the video, storing anchor information and link information, and dynamically displaying the anchor based on display attributes of the video and the anchor.

Patent document 1: Japanese Laid-Open Patent Publication No. H8-123816

An anchor may be set to an object in the video by a method of, for example, extracting the shape of the object by extracting edges in each frame in the video, and furthermore, extracting the error between frames, to extract the movement of the object. An anchor is, for example, an element set in a hyperlink.

When an object that is the target for setting an anchor moves in the video, in the conventional technology, the position coordinates of the object in each frame are identified, and the position of the anchor is defined by the frame number and the position coordinates of the object.

Meanwhile, there may be cases of editing the anchor that has already been set in the object. For example, it is assumed that an object is extracted by edge extraction, and an anchor positioned at this object. Depending on the precision of edge extraction, there may be a difference between the position or shape of the object in an image viewed by a person and the position or shape of the object recognized by the computer according to edge extraction. In this case, there arises the operation of changing the position of the anchor in the frame so that the anchor is superposed on the object as viewed by a person. In the following, this operation is also referred to as an editing operation.

However, if the position coordinates of the object in each frame are identified and the position of the anchor is defined by a frame number and position coordinates, there will be a number of definitions of anchor positions corresponding to the number of frames. Therefore, the data amount relevant to anchor positions becomes large.

Assuming that an operation of editing the anchor position is performed for the definitions of anchor positions present in the respective frames, changes will be made for the respective definition data items corresponding to the number of frames. This is a time-consuming process for the editor.

SUMMARY

According to an aspect of the embodiments, a non-transitory computer-readable recording medium storing a program that causes a computer to execute a process including receiving a setting of an anchor to a subject in an image included in a video; determining whether a movement amount between the subject to which the anchor has been set in a predetermined image in the video and the subject in another image included in the video is greater than or equal to a predetermined value; and storing, in a storage unit, an identifier of the another image that is a determination target, and position information of the anchor, when the movement amount is determined to be greater than or equal to the predetermined value.

The object and advantages of the invention will be realized and attained by means of the elements and combinations particularly pointed out in the appended claims. It is to be understood that both the foregoing general description and the following detailed description are exemplary and explanatory and are not restrictive of the invention as claimed.

BRIEF DESCRIPTION OF THE DRAWINGS

FIG. 2 illustrates an example of a data structure of anchor information;

FIG. 3 illustrates an example of anchor information;

FIG. 4 is a diagram for describing automatic generation of an anchor position;

DESCRIPTION OF EMBODIMENTS

Figure 1:
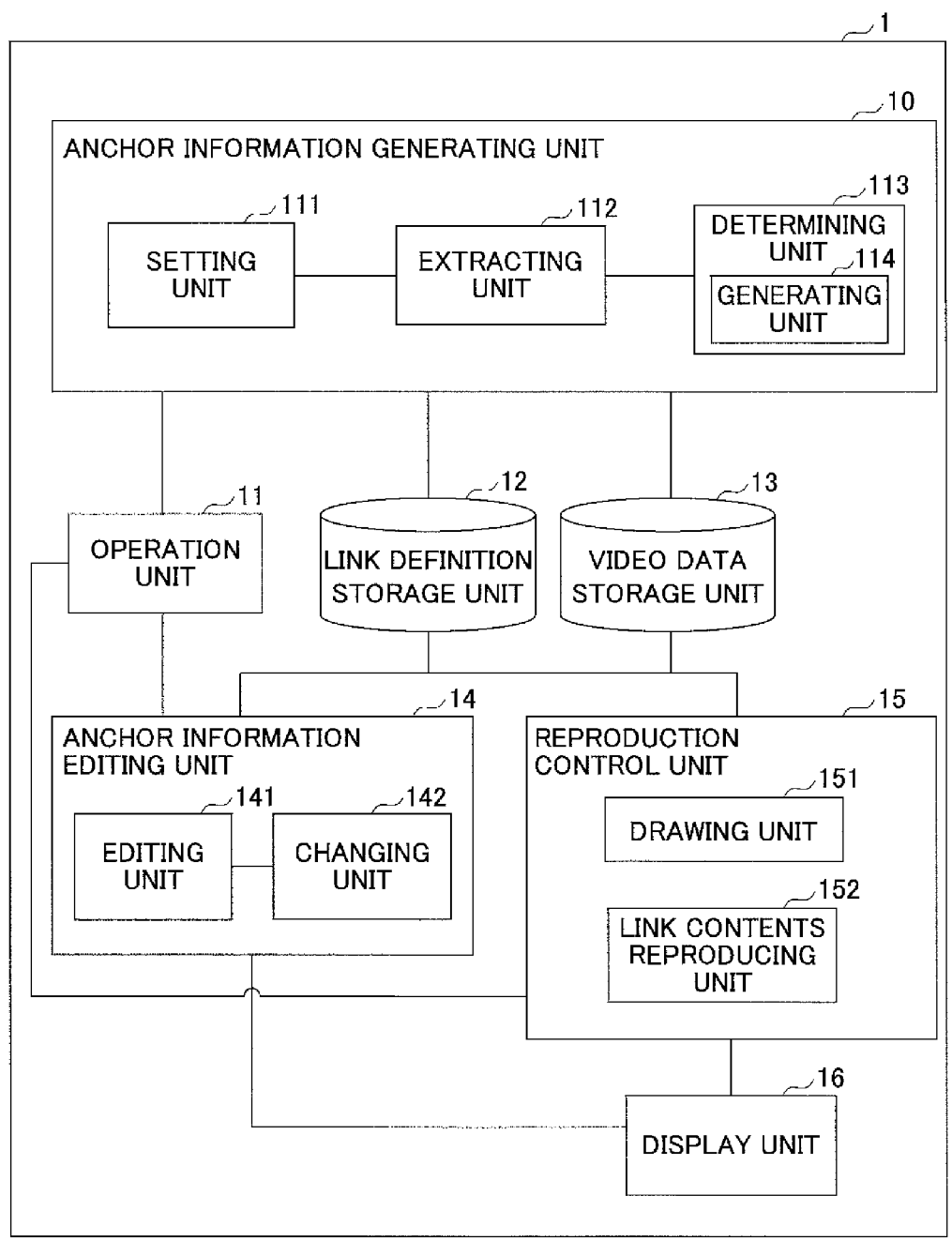
FIG. 1 is a block diagram illustrating an example of a functional configuration of an information processing device according to an embodiment.
Figure 5A:
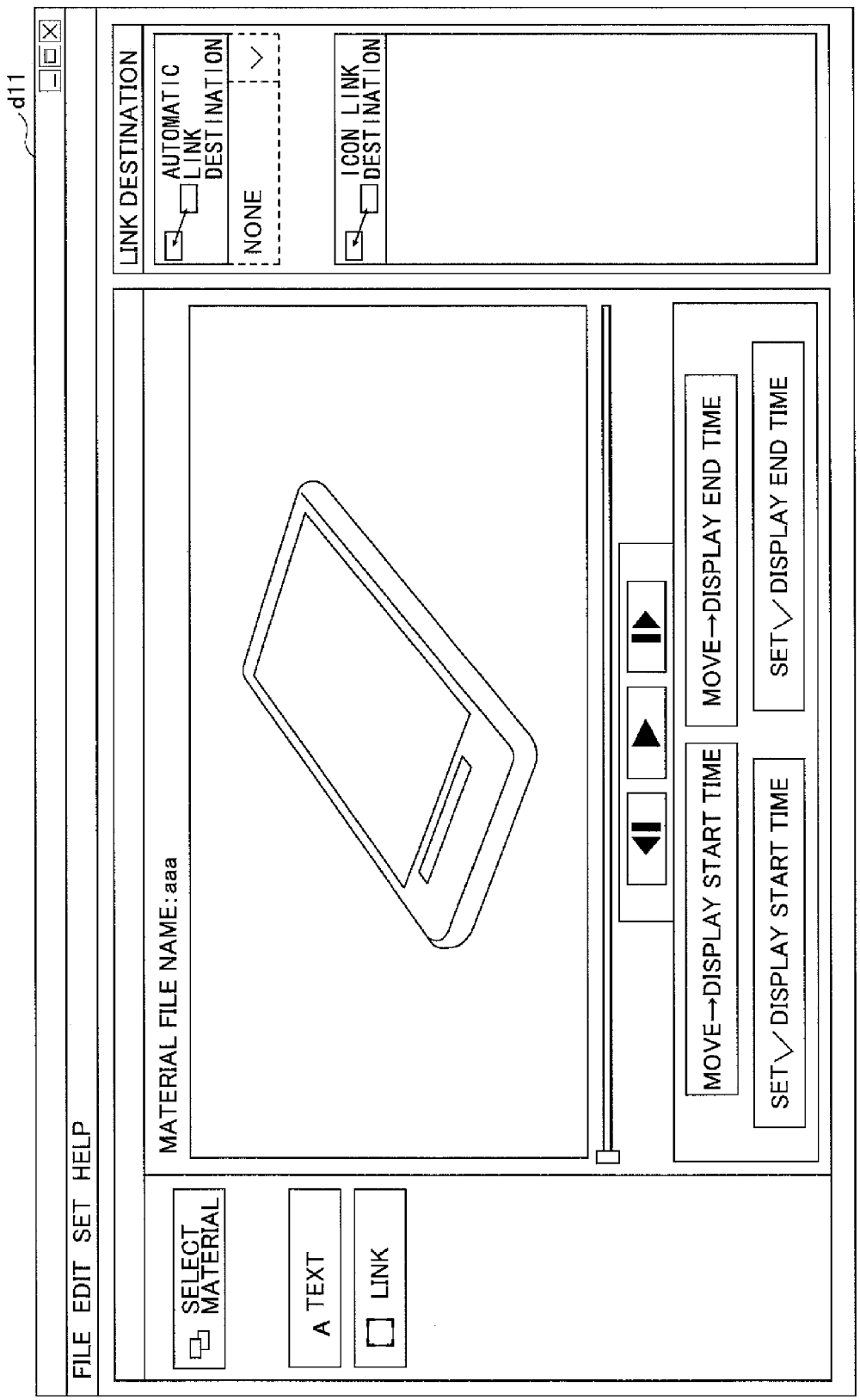
FIGS. 5A through 5D are for describing an example of automatic generation and editing of the anchor position.
Figure 5B:
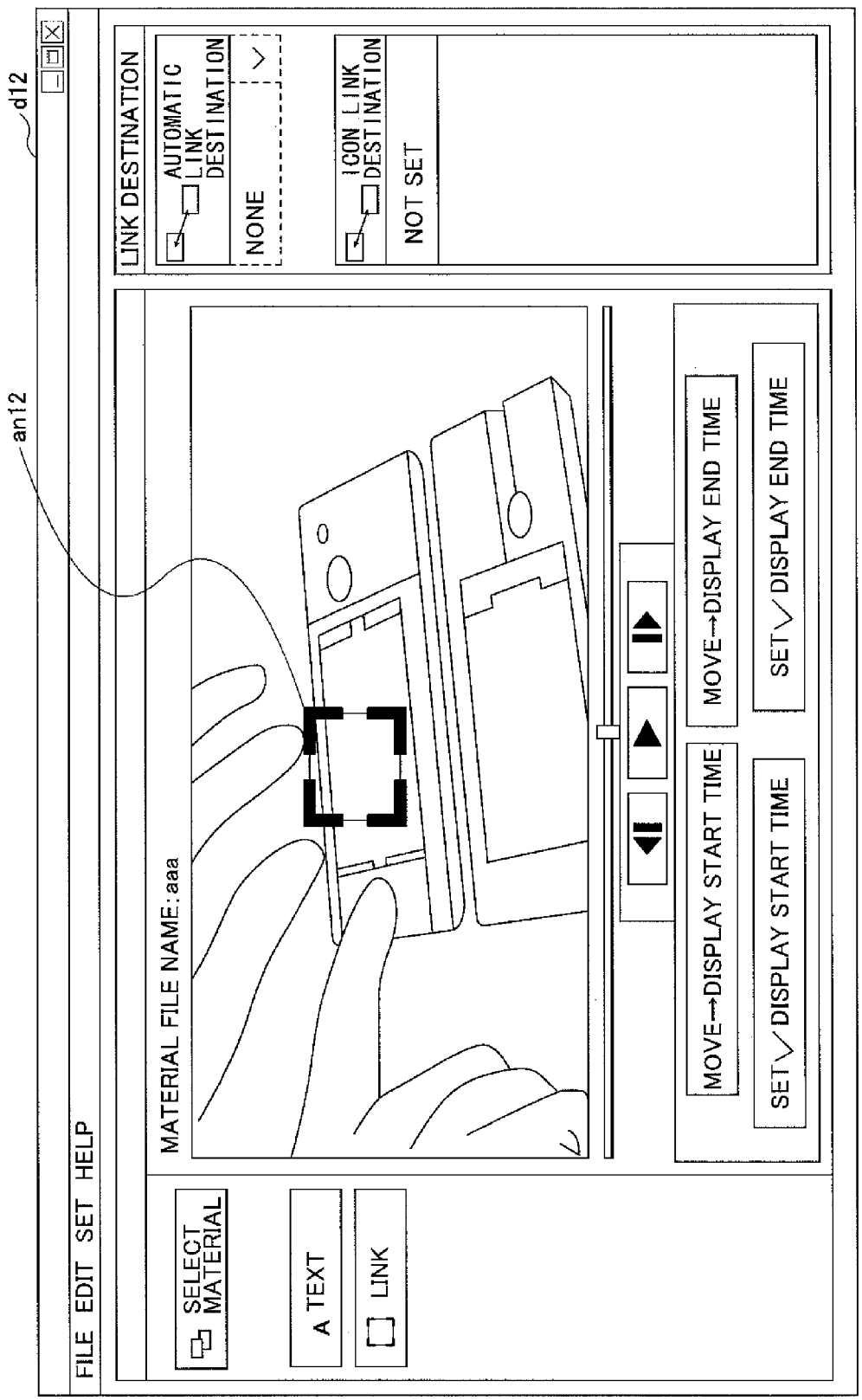
Figure 5C:
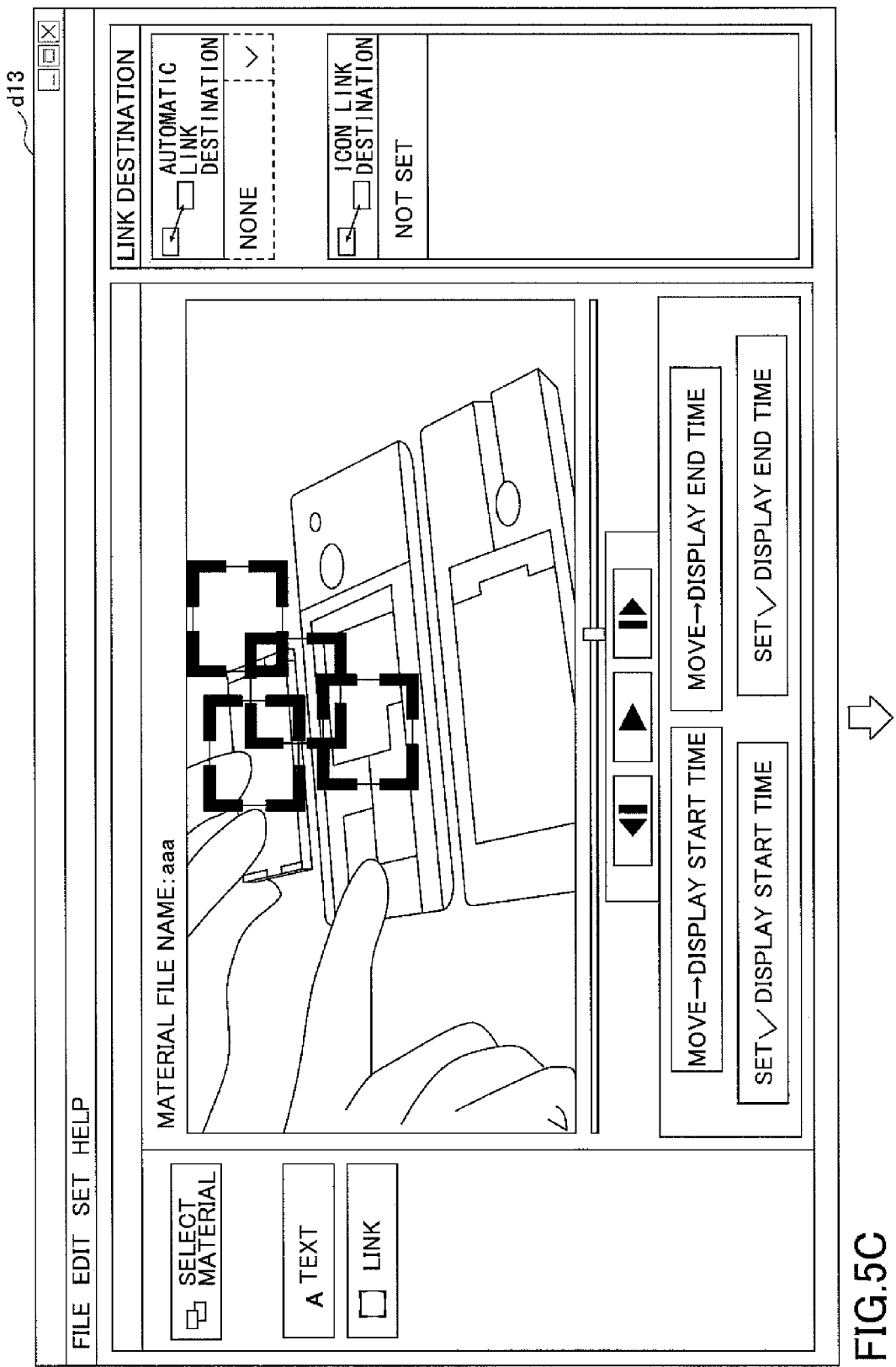
Figure 5D:
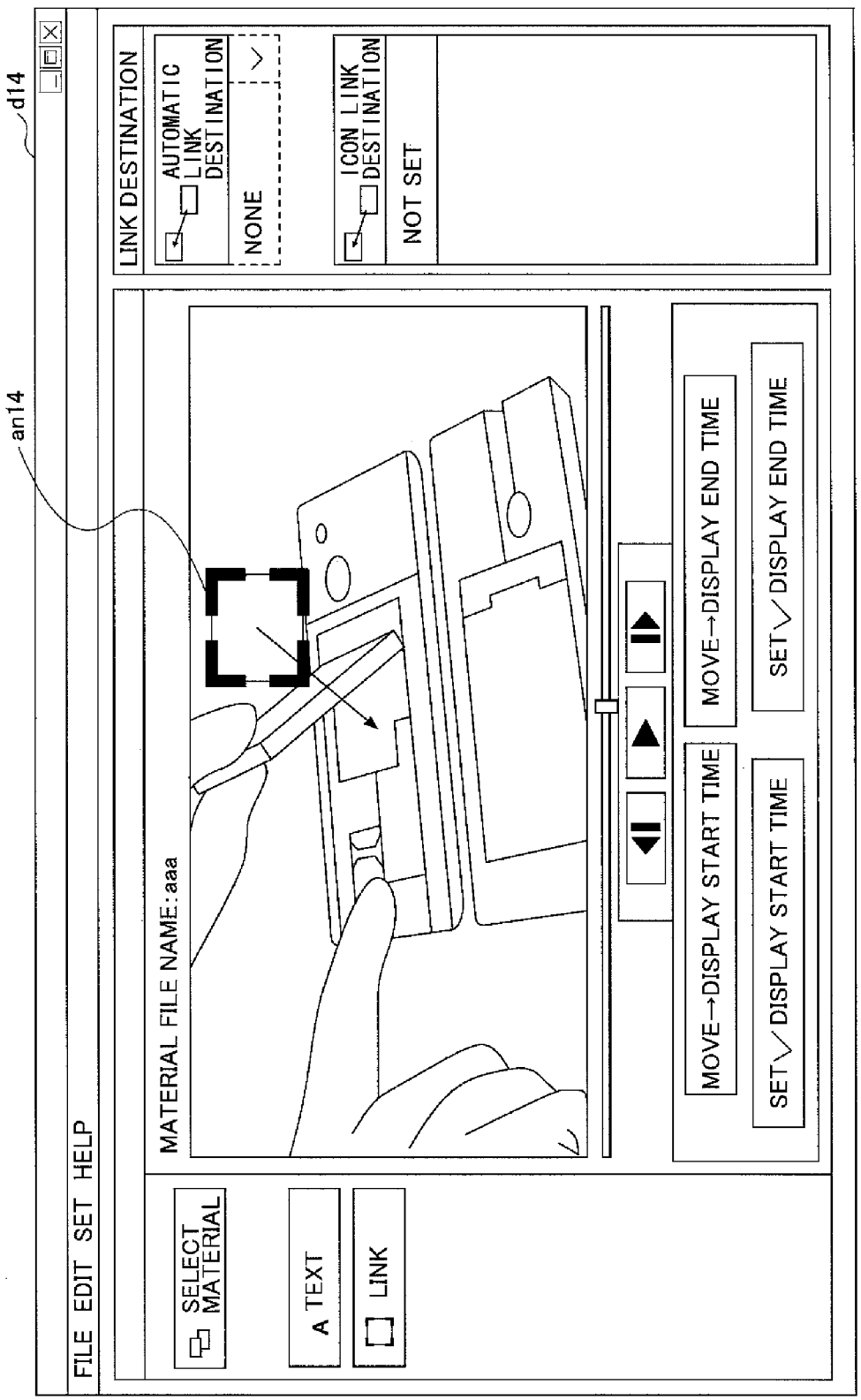

Preferred embodiments of the present invention will be explained with reference to accompanying drawings.
Embodiments
Configuration FIG. 1 is a block diagram illustrating an example of a functional configuration of an information processing device 1 according to an embodiment. The information processing device 1 has a function of setting an anchor, for which a link destination is set, to a subject (object) of a video. The anchor is, for example, an icon for calling the link destination. In the following, this icon is also referred to as a link icon.

The information processing device 1 may have a function of editing a set anchor. The information processing device 1 may have a function of displaying or reproducing a link destination associated with an anchor, when the anchor is pressed or instructed while a video is being reproduced.

The information processing device 1 illustrated in FIG. 1 includes an anchor information generating unit 10, an operation unit 11, a link definition storage unit 12, a video data storage unit 13, an anchor information editing unit 14, a reproduction control unit 15, and a display unit 16.

The anchor information generating unit 10 first reads and acquires a video from the video data storage unit 13, and receives a frame for setting an anchor and a setting of the anchor position. The anchor information generating unit 10 has a function of automatically extracting, from a subsequent frame, an object on which an anchor is set, and causing the anchor to follow the object.

When the object is automatically extracted, the anchor information generating unit 10 determines whether to store the position of the anchor, depending on the movement amount of the object or anchor. Accordingly, the anchor information need not be stored for every frame, and therefore the data amount of the anchor information is reduced.

For realizing the above functions, the anchor information generating unit 10 includes a setting unit 111, an extracting unit 112, and a determining unit 113. The setting unit 111 receives, from the operation unit 11, a frame for setting an anchor among the frames included in a video, and the position of the anchor in the received frame.

The position of the anchor is expressed by coordinates in a frame and is also referred to as anchor position information. The setting unit 111 outputs an identifier indicating the received frame and anchor position information to the extracting unit 112. The identifier indicating the frame is also referred to as a frame identifier, which may be a frame number, or a time code or time stamp indicating the reproduction time from the beginning of the video.

The extracting unit 112 automatically extracts, from a frame in which an anchor is set, the area of an object with the use of an image recognition technology, around the position where the anchor is set. For example, the extracting unit 112 automatically extracts coordinates of the object area that is recognized by performing edge extraction. The coordinates of the object are, for example, the center coordinates of the object area.

The extracting unit 112 tracks the extracted object in the subsequent frames, and outputs the recognized object coordinates to the determining unit 113.

The determining unit 113 determines whether the recognized object has moved by a movement amount that is greater than or equal to a predetermined length from the object inside another frame. For example, the determining unit 113 determines whether the movement amount between the object in the present frame and the object in a frame immediately before the present frame is greater than or equal to a predetermined value. Accordingly, the determining unit 113 may determine a case where the movement amount of the object is large within a short period of time.

The movement amount may be, for example, the difference in object coordinates between frames, and the movement of the object area on which an inter-frame error extraction process is performed. Furthermore, the movement amount may be the movement amount of the center coordinates of the anchor.

The predetermined value is, for example, the size of one object extracted at the extracting unit 112. Furthermore, the predetermined value may the size of the anchor, and may be a value that is appropriately set according to experiments.

Furthermore, the determining unit 113 determines whether the movement amount between the object of the present frame and the object in a newest frame that is stored in the link definition storage unit 12 described below or a newest frame that is a storage target, is greater than or equal to a predetermined value. Accordingly, the determining unit 113 determines a case where the object has moved by a movement amount that is greater than or equal to a predetermined value from the position that is the determination reference, as a result of moving by small amounts.

The newest frame that is stored in the link definition storage unit 12 or a newest frame that is a storage target, is a frame before the present frame and closest to the present frame.

Furthermore, the determining unit 113 may determine whether a negative determination result, indicating that the movement amount of the object is less than a predetermined value, has continued for more than or equal to a predetermined time period. Furthermore, the determining unit 113 may determine whether the frame is the final frame or the first frame in which an anchor is set by a user. A final frame means the last frame in which the subject having a set anchor is displayed, or the final frame in the video.

The determining unit 113 includes a generating unit 114. When the determining unit 113 determines that the movement amount is greater than or equal to a predetermined value, the generating unit 114 generates a frame identifier and anchor position information of the determination target, and stores the generated information in the link definition storage unit 12. The anchor position information is, for example, the center coordinates of the extracted object.

When the present frame and the frame immediately before the present frame are determination targets, the generating unit 114 associates the frame identifier of the present frame with the anchor position information of the present frame, associates the frame identifier of the frame immediately before the present frame with the anchor position information of the frame immediately before the present frame, and stores these in the link definition storage unit 12.

When the present frame and the newest frame stored in the link definition storage unit 12 are the determination targets, the generating unit 114 associates the frame identifier of the present frame with the anchor position information of the present frame and stores these in the link definition storage unit 12. In the following, information including the frame identifier and the anchor position information of the present frame is also referred to as anchor information. The generating unit 114 is described as being included in the determining unit 113; however, the generating unit 114 may be a different unit from the determining unit 113.

When the movement amount of less than a predetermined value continues for more than or equal to a predetermined time period, or when the present frame is the final frame, or when the present frame is the first frame having an anchor set, the generating unit 114 associates the frame identifier of the present frame with the anchor position information, and stores these in the link definition storage unit 12.

Accordingly, when setting an anchor, the anchor information generating unit 10 need not define anchor information for each frame. Furthermore, the anchor information generating unit 10 only stores anchor information for a frame where the movement amount of an object having an anchor set is large, and therefore the data amount of anchor information is reduced.

The operation unit 11 has a GUI (Graphical User Interface) operation function, and sets the anchor position, sets the link destination to be associated with the anchor, edits the anchor position, instructs reproduction of the video, and selects an anchor. When the above operations are received from a user, the operation unit 11 reports the operation contents to the respective units.

The link definition storage unit 12 stores the anchor information generated at the anchor information generating unit 10. The anchor information includes the anchor position information first set by the user, and the frame identifier of this anchor position information. Furthermore, the anchor information includes information of the link destination associated with the anchor. The anchor information is described below with reference to FIG. 2.

The video data storage unit 13 stores video data. The video data is, for example, contents for setting an anchor associated with a link destination. Examples of the video data are an operation manual for a mobile terminal and a checkup manual for a private car.

The link definition storage unit 12 and the video data storage unit 13 are described as different storage units, but may the same storage device. Examples of the link definition storage unit 12 and the video data storage unit 13 are a RAM (Random Access Memory) such as a VRAM (Video Random Access Memory), and a semiconductor memory device such as a ROM (Read-Only Memory) and a flash memory. As the link definition storage unit 12 and the video data storage unit 13, a storage device such as a hard disk and an optical disk may be applied.

The anchor information editing unit 14 edits the position information of an anchor set in a video. The anchor information generating unit 10 automatically generates anchor position information, and therefore the position may be different from the object in the actual video. Therefore, in this case, the editor has to edit the anchor position. The anchor information editing unit 14 has a function of facilitating the operation of editing the anchor information.

The anchor information editing unit 14 includes an editing unit 141 and a changing unit 142. The editing unit 141 uses a video stored in the video data storage unit 13 and anchor information stored in the link definition storage unit 12 to reproduce a video in which an anchor is displayed.

At this time, the editing unit 141 controls the operation of displaying, on the display unit 16, an edit screen in which it is possible to edit the anchor position and the link destination. When an anchor is edited with the use of an editing screen displayed on the display unit 16, the editing unit 141 receives an editing operation relevant to the anchor, from the operation unit 11.

For example, the editing unit 141 receives changes in the anchor position and changes in the link destination associated with the anchor, from the operation unit 11. The editing unit 141 reports the contents of user operations received from the operation unit 11, such as the frame identifier of an edited frame and changed anchor position information, to the changing unit 142.

The changing unit 142 changes the anchor information stored in the link definition storage unit 12, based on operation contents acquired from the editing unit 141. For example, the operation contents include a frame identifier and the edited anchor position information.

In this case, the changing unit 142 searches the anchor information stored in the link definition storage unit 12, for a frame identifier matching the frame identifier included in the acquired operation contents. The changing unit 142 changes the anchor position information associated with the matching frame identifier, to the edited anchor position information.

Accordingly, the editing operation only needs to be performed on the frame stored in the link definition storage unit 12, and therefore the editing operation is facilitated.

The reproduction control unit 15 performs a control operation to read and acquire video data from the video data storage unit 13, read and acquire anchor information from the link definition storage unit 12, and reproduce a video in which an anchor is superposed, on the display unit 16.

The reproduction control unit 15 includes a drawing unit 151 and a link contents reproducing unit 152. When a frame indicated by the frame identifier stored in the anchor information is displayed on the display unit 16, the drawing unit 151 draws an anchor at a position indicated by the anchor position information, and superposes the anchor on the video.

When a frame other than the frame indicated by the frame identifier stored in the link definition storage unit 12 is displayed, the drawing unit 151 performs interpolation calculation and continuously displays the anchor. Interpolation calculation is performed by linearly interpolating the respective anchor position information items corresponding to two frames positioned before and after the frame that is the display target, among the frames stored in the link definition storage unit 12. The drawing unit 151 draws the anchor that has undergone linear interpolation by, for example, animation drawing.

Accordingly, the drawing unit 151 does not need to repeatedly draw all anchor pixels for every displayed frame. Only the anchor that has undergone linear interpolation is displayed. Therefore, the drawing unit 151 only needs to repeatedly draw the requisite minimum amount of pixels. The requisite minimum amount of pixels means the pixels that have been changed. Therefore, it is possible to prevent the anchor image from flickering compared to the case of repeatedly drawing all anchor pixels.

When an anchor is pressed, a report is received from the operation unit 11 that an anchor has been selected, and the link contents reproducing unit 152 moves to the link destination associated with the anchor, and reproduces, for example, video hyperlink contents on the display unit 16.

Various integrated circuits and electric circuits may be used as the anchor information generating unit 10, the anchor information editing unit 14, and the reproduction control unit 15. Examples of an integrated circuit are an ASIC (Application Specific Integrated Circuit) and a FPGA (Field Programmable Gate Array). Examples of an electric circuit are a CPU (Central Processing Unit) and a MPU (Micro Processing Unit).

Anchor Information

Next, a description is given of a data structure of anchor information stored in the link definition storage unit 12. FIG. 2 illustrates an example of a data structure of anchor information. As illustrated in FIG. 2, the anchor information includes an anchor identifying name (name), an anchor type (type), and anchor area (size), link destination information (link), the frame position or the elapsed time (time) used for synchronizing with video data indicating data (data) relevant to the anchor, and anchor position information (px, py) indicating coordinates of an anchor on a screen.

The anchor type indicates an icon or a link type. The anchor area indicates the size of a click range. Coordinates on the screen are indicated by using the original size of the video as a standard.

The data (data) has a hierarchal structure, and may include plural items of "time" and "(px, py)". Either the frame position or elapsed time may be used, as long as it is a value for identifying the frame in the video such as a frame number.

Next, a description is given of an example of anchor information. FIG. 3 illustrates an example of anchor information. In the example illustrated in FIG. 3, the anchor information is expressed by XML (Extensible Markup Language).

For example, the anchor identifying name is "sampleA", the anchor type is "LINK", the anchor area is "60", and the link destination information is "nextset". In the example of FIG. 3, four sets of frame identifiers and anchor position information items are held. The frame identifiers and anchor position information items are information generated by the anchor information generating unit 10.

Generation and Editing of Anchor Position Information

Next, automatic generation of an anchor position is specifically described. FIG. 4 is a diagram for describing automatic generation of an anchor position. In the example illustrated in FIG. 4, frames t11 through t14 are displayed in order. Furthermore, in the frame of t11, the user has specified an object (subject) for setting an anchor.

At this time, the anchor information generating unit 10 extracts the edges around the specified object, and extracts the object area. The anchor information generating unit 10 uses the center coordinates of the extracted object area as anchor position information, associates an identifier (for example, a time code) of the frame t11 with this anchor position information, and stores this information in the link definition storage unit 12.

Next, the anchor information generating unit 10 (extracting unit 112) tracks the object in the frame t12, and obtains the movement amount of the object from the frame t11 by an inter-frame error extraction process. The anchor information generating unit 10 (determining unit 113) determines whether the movement amount is greater than or equal to a predetermined value, and at this point, it is determined that the movement amount is less than the predetermined value. The predetermined value is assumed to be the object size in this example.

Next, the anchor information generating unit 10 (extracting unit 112) tracks the object in the frame t13, and obtains the movement amount of the object from the frame t12. The anchor information generating unit 10 (determining unit 113) determines whether the movement amount is greater than or equal to the predetermined value, and at this point, it is determined that the movement amount is greater than or equal to the predetermined value.

The anchor information generating unit 10 (generating unit 114) stores the frame identifiers of t12 and t13, and the anchor position information of the frames of t12 and t13, in the link definition storage unit 12. In this example, the frame identifier is a time code and the anchor position information is the center coordinates of the object.

Next, the anchor information generating unit 10 (extracting unit 112) tracks the object in the frame 14, and obtains the movement amount of the object from the frame t13. The anchor information generating unit 10 (determining unit 113) determines whether the movement amount is greater than or equal to the predetermined value, and at this point, it is determined that the movement amount is greater than or equal to the predetermined value. The frame identifier of t13 and the anchor position information are already stored in the link definition storage unit 12, and therefore the anchor information generating unit 10 (generating unit 114) stores the frame identifier of t14 and the anchor position information of the frame t14 in the link definition storage unit 12.

Accordingly, there is no need to define the anchor in all frames after the frame in which the anchor is set, and therefore the data amount of the anchor information is reduced.

Next, a description is given of a specific example in which a battery pack of a mobile terminal is the object. FIGS. 5A through 5D are for describing an example of automatic generation and editing of the anchor position. In the example of FIGS. 5A through 5D, a battery pack of a mobile terminal is set as the object.

The anchor information generating unit 10 (setting unit 111) reads and acquires the target video from the video data storage unit 13. At this time, the start frame of the displayed video is the image inside a screen d11.

Next, in screen d12, the user sets an anchor an12 at the position of the battery pack. For example, the anchor an12 is set by pressing a link button so that the anchor an12 is displayed on the screen d12, and by moving the position of this anchor an12.

First, when an anchor is set, the anchor information generating unit 10 tracks the object in which the anchor is set, to automatically generate an anchor position where the movement amount of the object is large.

The screen d13 is for previewing the anchor position information that has been automatically generated, and for confirming the anchor position.

The screen d14 is a screen for editing the anchor position that has been automatically generated. The user identifies the frame for adjusting the position by frame-by-frame advance, and moves an anchor an14 displayed in the identified frame to a desired position by a drag operation.

Accordingly, the editor only needs to confirm the anchor position information in the frame indicated by the frame identifier stored in the link definition storage unit 12, and does not need to confirm the position of the anchor in all of the frames. Therefore, the editing operation is easy.

Drawing Anchor, Reproducing Video

Figure 6:
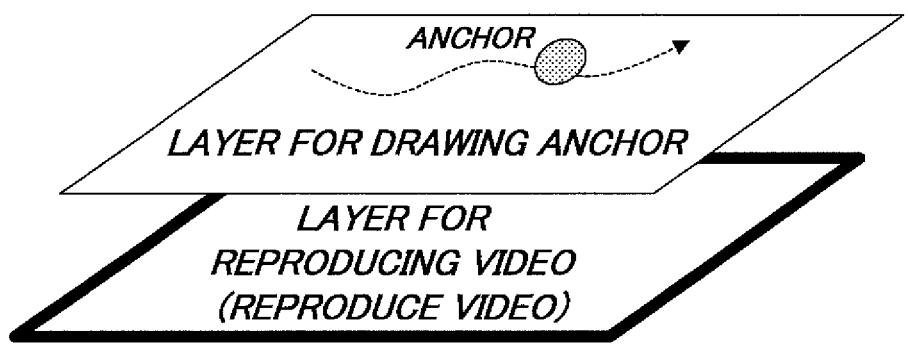
FIG. 6 illustrates an example of drawing an anchor.

Next, a description is given of a structure of the video and the drawing of the anchor. FIG. 6 illustrates an example of drawing an anchor. In the example of FIG. 6, a layer for drawing an anchor is superposed on a layer for reproducing a video. By this structure, the anchor may be superposed on an object in a video that is being reproduced.

Figure 7:
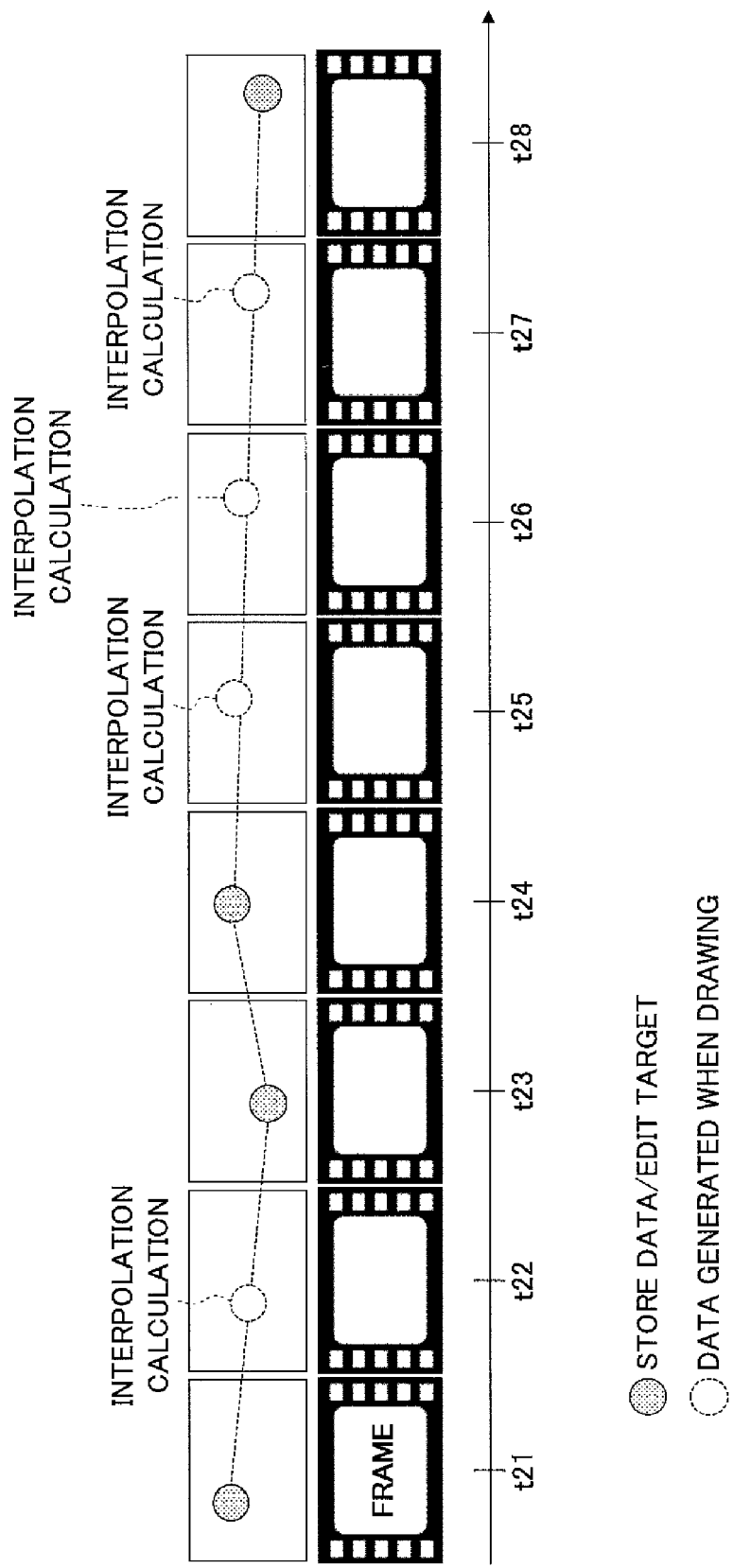
FIG. 7 is for describing an example of a displayed anchor.

FIG. 7 is for describing an example of a displayed anchor. In the example of FIG. 7, the anchor information is stored in the link definition storage unit 12 at frames t21, t23, t24, and t28. The drawing unit 151 draws an anchor at a position indicated by the anchor position information in a frame indicated by the frame identifier stored in the link definition storage unit 12.

The drawing unit 151 performs interpolation calculation based on the position of the anchor to be drawn, for frames other than the frame indicated by the frame identifier stored in the link definition storage unit 12, to draw the anchor by animation drawing, for example.

For example, the anchor of frame t22 is displayed in the middle of the anchor position of frame t21 and the anchor position of t23. Furthermore, the anchors of frames t25 through t27 are displayed at positions obtained by performing interpolation calculation on the anchor positions of frame t24 and the anchor position of frame t28.

The anchors displayed in frames t21, t23, t24, and t28 of FIG. 7 are the editing targets. In the general technology, the anchor position information of frames t21 through t28 is stored, and the anchors of frames t21 through t28 are editing targets.

Accordingly, in the present embodiment, the anchors are not drawn by repeatedly drawing all pixels of the anchor in every frame; the anchors may be drawn by a drawing method based on the animation of coordinate movement. Therefore, it is possible to smoothly display the anchor without flickering.

Figure 8:
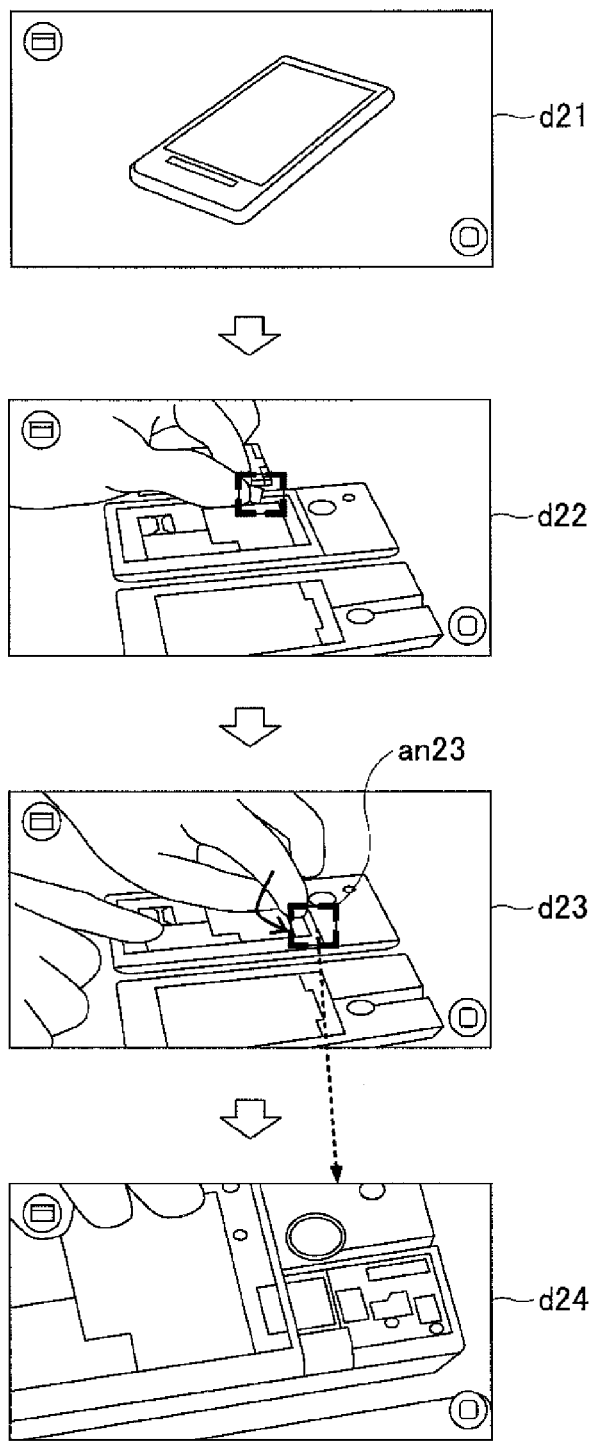
FIG. 8 is for describing the link destination display.

Next, a description is given of a specific example in which a micro SD card of a mobile terminal is the object. FIG. 8 is for describing the link destination display. The example of FIG. 8 is a video for describing the operation of inserting a micro SD card in a mobile terminal. Furthermore, in the example of FIG. 8, an anchor is set at the micro SD card.

The screen d21 displays the mobile terminal in which the micro SD card is to be inserted. The reproduction control unit 15 reads the target video from the video data storage unit 13, reads the anchor information from the link definition storage unit 12, and reproduces the image of a screen d21. At this time, an anchor is not set in the screen d21.

In a screen d22, a hand holding a micro SD card is displayed, and an anchor is superposed on the micro SD card. When a frame indicated by a frame identifier included in the anchor information is reproduced, the drawing unit 151 draws the anchor in the frame. In a screen d22, the anchor is drawn.

In a screen d23, the micro SD card is being inserted in the mobile terminal. At this time, it is assumed that an anchor an23 in the image of the screen d23 is selected. The anchor an23 is drawn to follow the micro SD card while the video is being reproduced.

At this time, for frames for which anchor information is not stored, interpolation calculation (for example, linear interpolation of coordinates) is performed, and the anchor is continuously displayed. Selection of the anchor may be detected when the anchor is clicked with a mouse or when the anchor is pressed in a touch panel.

In a screen d24, one frame of the video that is the link destination associated with the anchor is displayed. When a report that the anchor an23 has been selected is received, the link contents reproducing unit 152 links to the link destination information included in the anchor information, and reproduces the video of the link destination. In a screen d24, the position where the micro SD card is to be inserted is enlarged.

Accordingly, even in frames for which anchor information is not stored, the anchor is continuously displayed. When the anchor is selected, it is possible to move to the link destination and reproduce the linked video.

Operation

Figure 9:
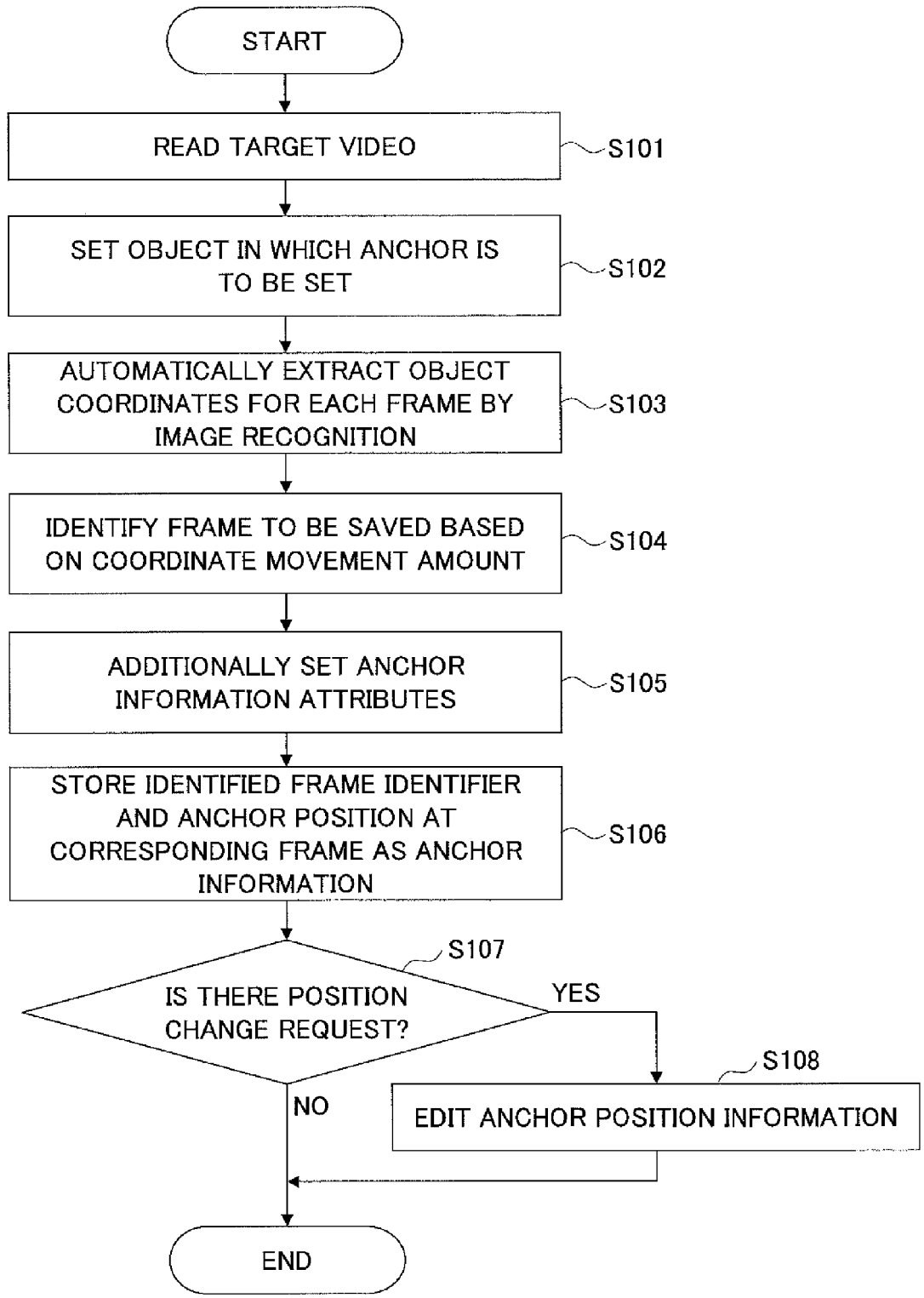
FIG. 9 is a flowchart indicating an example of an anchor setting process.

Next, a description is given of an operation of the information processing device 1. FIG. 9 is a flowchart indicating an example of an anchor setting process. At step S101 of FIG. 9, the anchor information generating unit 10 reads and acquires the target video from the video data storage unit 13. Here, the anchor information generating unit 10 reproduces the target video regularly or reproduces the target video by frame-by-frame advance, and waits for an object for setting an anchor to be specified.

At step S102, the setting unit 111 receives, from the operation unit 11, an object for setting an anchor specified by a user. At this time, the setting unit 111 identifies a start frame in which position coordinates of an object and an anchor are set. The position coordinates of an object are, for example, the center coordinates of the anchor, in a case where a specification is made as indicated in the screen d12 of FIG. 5B.

At step S103, the extracting unit 112 extracts object coordinates by performing image recognition, for each frame after the start frame in the video. For example, the extracting unit 112 extracts the object area by edge extraction, and uses the center coordinates of the object area as object coordinates.

At step S104, the determining unit 113 identifies the frame for which anchor information is to be saved, based on the movement amount of the object coordinates between the present frame and another past frame other than the present frame. The process of step S104 is described below with reference to FIG. 10.

In step S105, the anchor information generating unit 10 additionally sets the attribute of the anchor information. The attribute of the anchor information is, for example, the display attribute and a name of a link destination.

In step S106, the generating unit 114 stores, as anchor information, a frame identifier and anchor position information of a frame identified as a saving target, in the link definition storage unit 12.

In step S107, the anchor information editing unit 14 previews the set anchor, and determines whether a position change request is reported from the operation unit 11. When there is a position change request (YES at step S107), the process proceeds to step S108, and when there is no position change request (NO at step S107), the process ends.

At step S108, the changing unit 142 edits the anchor position information. For example, the changing unit 142 acquires the frame identifier of the frame that is the editing target and the anchor position information after being edited, and changes the anchor position information of the frame that is the editing target stored in the link definition storage unit 12 to the anchor position information after being edited.

Figure 10:
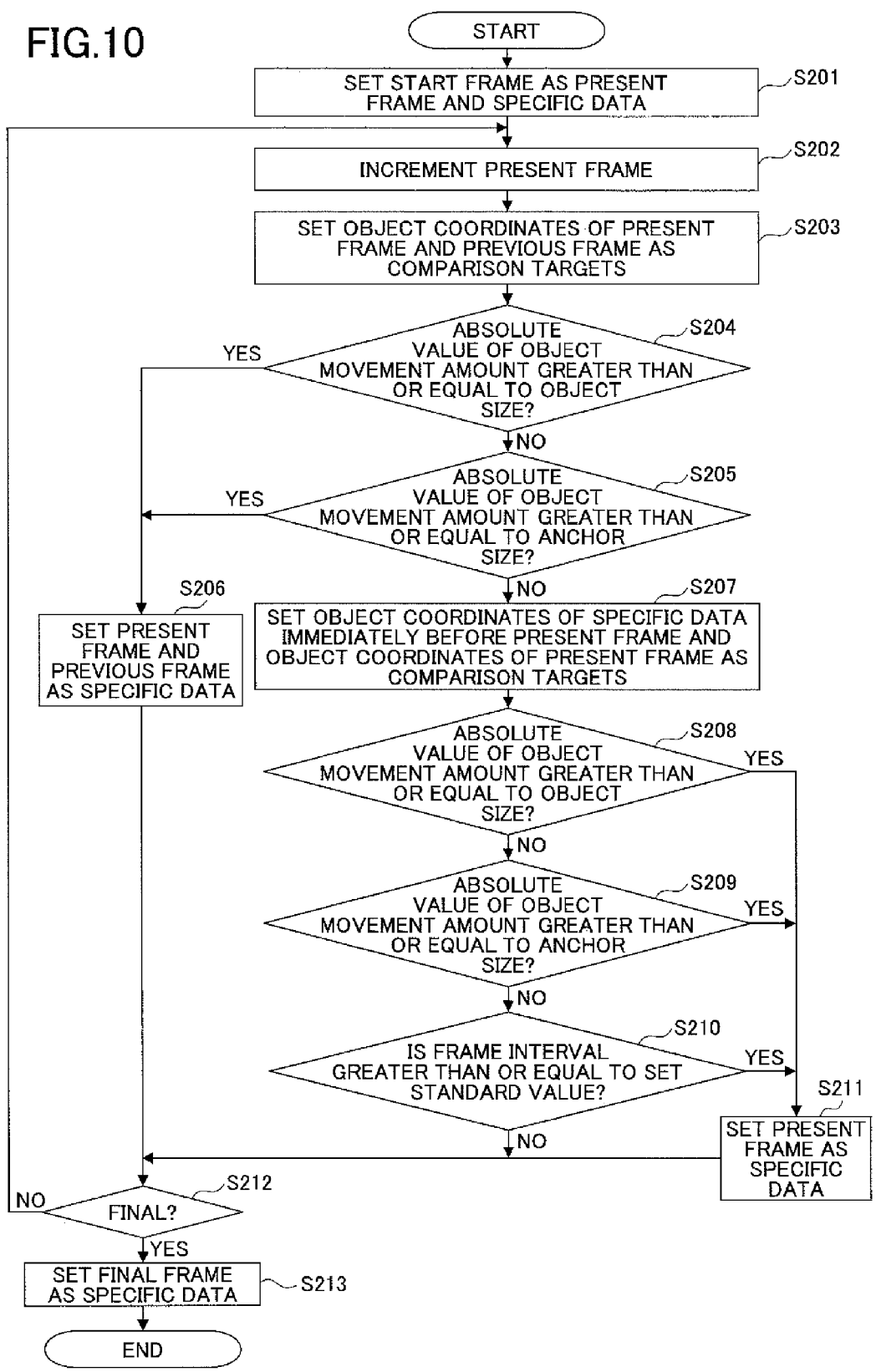
FIG. 10 is a flowchart of an example of a process of generating anchor information.

Next, a detailed description is given of the process of step S104. FIG. 10 is a flowchart of an example of a process of generating anchor information. At step S201 of FIG. 10, the generating unit 114 sets the start frame as the present frame and specific data. A present frame is a frame used as a standard of a determination target. Specific data is data that is a target for being stored in the link definition storage unit 12.

At step S202, the determining unit 113 increments the present frame. By incrementing the present frame, the present frame becomes the next frame in the display time order.

At step S203, the determining unit 113 sets the object coordinates of the present frame and a previous frame as comparison targets. A previous frame is, for example, a frame immediately before the present frame.

At step S204, the determining unit 113 determines whether the absolute value of the movement amount indicating the difference in the object coordinates is greater than or equal to a predetermined value (object size). In the following, the movement amount indicating the difference in object coordinates is also referred to as an object movement amount. When the absolute value of the object movement amount is greater than or equal to the object size (YES at step S204), the process proceeds to step S206, and when the absolute value of the object movement amount is less than the object size (NO at step S204), the process proceeds to step S205. When the absolute value of the object movement amount is greater than or equal to the object size, it means that the object has moved so that the object areas do not overlap each other between frames.

At step S205, the determining unit 113 determines whether the absolute value of the object movement amount is greater than or equal to a predetermined value (anchor size). When the absolute value of the object movement amount is greater than or equal to the anchor size (YES at step S205), the process proceeds to step S206, and when the absolute value of the object movement amount is less than the anchor size (NO at step S205), the process proceeds to step S207. When the absolute value of the object movement amount is greater than or equal to the anchor size, it means that the object has moved more than the length, the width, or the diagonal line of the anchor between frames.

The reason why the determination at step S205 is made is because when the size of the object is large, the determination is rarely YES at step S204. Therefore, in a case where the object has moved by an amount greater than or equal to the anchor size, this present frame is set as specific data.

At step S206, the generating unit 114 sets the present frame and a previous frame as specific data. When the previous frame is already set as specific data, the generating unit 114 only sets the present frame as specific data.

The processes at steps S204 and S205 are for distinguishing a case where the movement amount between adjacent frames is large. Accordingly, it is possible to identify a case where the object has moved by a large amount instantaneously, and use the present data as specific data.

At step S207, the determining unit 113 sets the object coordinates of the specific data immediately before the present frame and the present frame as comparison targets. The specific data immediately before the present frame means the frame that is displayed last (newest) among the specific data items.

At step S208, the determining unit 113 determines whether the absolute value of the object movement amount is greater than or equal to a predetermined value (object size). When the absolute value of the object movement amount is greater than or equal to the object size (YES at step S208), the process proceeds to step S211, and when the absolute value of the object movement amount is less than the object size (NO at step S208), the process proceeds to step S209.

At step S209, the determining unit 113 determines whether the absolute value of the object movement amount is greater than or equal to a predetermined value (anchor size). When the absolute value of the object movement amount is greater than or equal to the anchor size (YES at step S209), the process proceeds to step S211, and when the absolute value of the object movement amount is less than the anchor size (NO at step S209), the process proceeds to step S210.

The processes of steps S208 and S209 are for distinguishing cases where the object has slowly moved from the frame of the specific data and the movement amount from the object of the specific data is large. Accordingly, it is possible to specify a case where the object has moved slowly and the object has moved by greater than or equal to a predetermined amount from the position of the object of the specific data, and set present frame as the specific data.

At step S210, the determining unit 113 determines whether the frame interval between the specific data immediately before the present frame and the present frame is greater than or equal to a set standard value (threshold). The threshold is, for example, 3 seconds or 5 seconds; however, a more appropriate value may by set based on experiments. When the frame interval is greater than or equal to the threshold (YES at step S210), the process proceeds to step S211, and when the frame interval is less than the threshold (NO at step S210), the process proceeds to step S212.

The reason for making the determination at step S210 is to cause the anchor to follow subtle movements of the object, and to set the present frame as the specific data at predetermined intervals.

At step S211, the generating unit 114 sets the present frame as specific data.

At step S212, the determining unit 113 determines whether the present frame is the final frame. When the present frame is the final frame (YES at step S212), the process proceeds to step S213, and when the present frame is not the final frame (NO at step S212), the process returns to step S202.

At step S213, the generating unit 114 sets the final frame as the specific data. The reason why the final frame is the specific data is that the position of the anchor of the final frame is used for interpolation calculation.

By the above process, there is no need to store the anchor information for all frames, and therefore the data amount of the anchor information is reduced.

Figure 11:
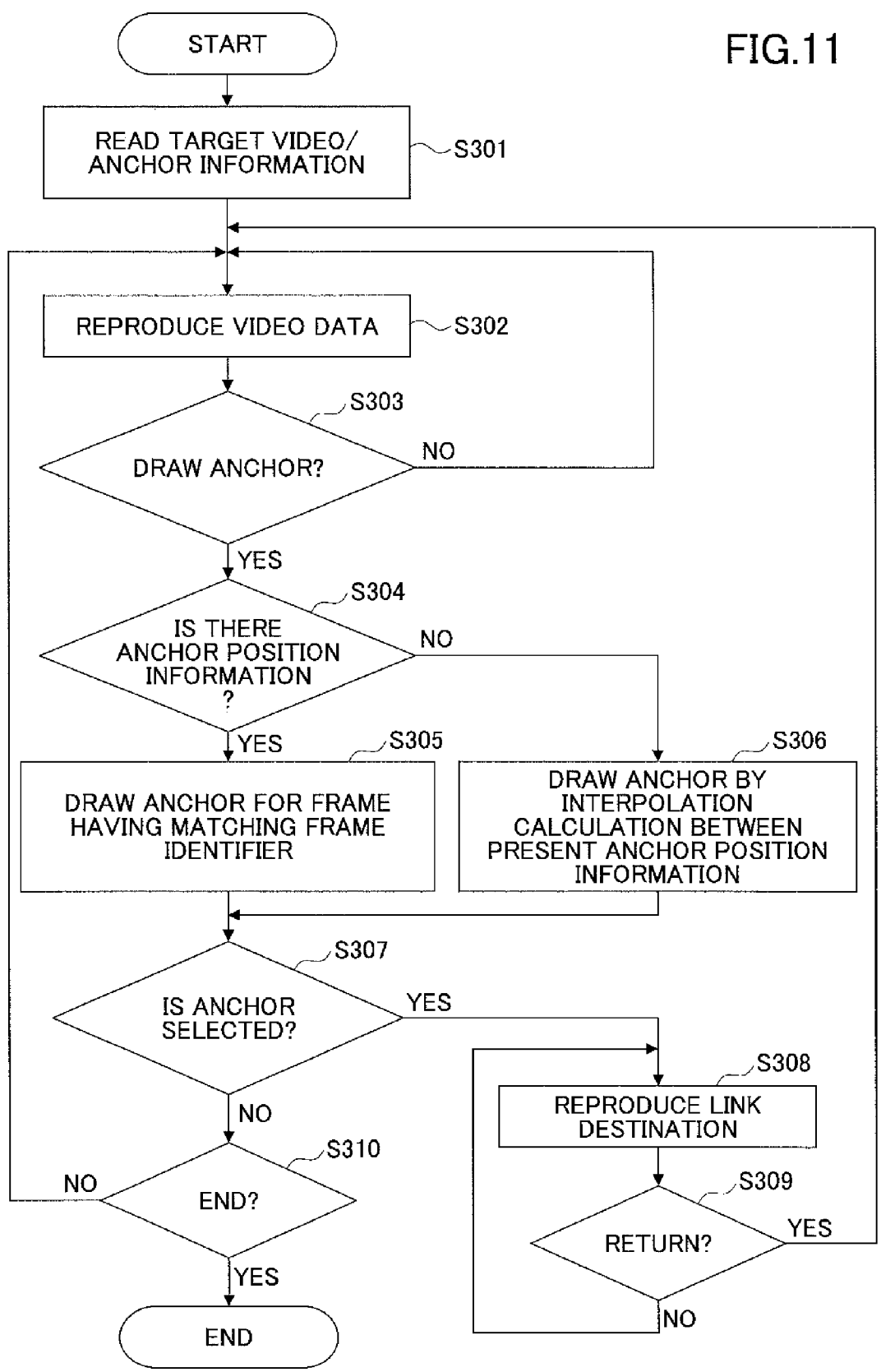
FIG. 11 is a flowchart indicating an example of a video reproduction process.

Next, a description is given of a process of reproducing a video in which an anchor is set. FIG. 11 is a flowchart indicating an example of a video reproduction process. At step S301 of FIG. 11, the reproduction control unit 15 reads the target video from the video data storage unit 13, and reads anchor information from the link definition storage unit 12.

At step S302, the reproduction control unit 15 reproduces the read video data. At step S303, the drawing unit 151 determines whether to draw an anchor. For example, the drawing unit 151 determines whether a frame, which is between a frame indicated by the first frame identifier included in the anchor information and a frame indicated by the last frame identifier included in the anchor information, is reproduced. When an anchor is to be drawn (YES at step S303), the process proceeds to step S304, and when an anchor is not to be drawn (NO at step S303), the process returns to step S302.

At step S304, the drawing unit 151 determines whether there is anchor position information associated with the frame that is the reproduction target. When there is anchor position information (YES at step S304), the process proceeds to step S305, and when there is no anchor position information (NO at step S304), the process proceeds to step S306.

At step S305, when the frame indicated by the frame identifier included in the anchor information is reproduced, the drawing unit 151 draws an anchor at a position indicated by the anchor position information, in synchronization with the frame or the reproduction time of the video data. For example, the anchor is a link icon.

At step S306, the drawing unit 151 obtains the display position of the anchor by performing interpolation calculation on the anchor position information present before and after the frame that is the display target. The drawing unit 151 moves the anchor to the obtained position and draws the anchor there.

At step S307, the link contents reproducing unit 152 determines whether the anchor has been selected. When the anchor is selected (YES at step S307), the process proceeds to step S308, and when the anchor is not selected (NO at step S307), the process proceeds to step S310.

At step S308, the link contents reproducing unit 152 reproduces the video of the link destination associated with the anchor. The link destination may not be a video; the link destination may be a still image or text.

At step S309, the link contents reproducing unit 152 determines whether the button for returning from the link destination to the video has been pressed. When the button has been pressed to return to the video (YES at step S309), the process returns to steps S302, and when the button has not been pressed to return to the video (NO at step S309), the process returns to steps S308.

At step S310, the reproduction control unit 15 determines whether the target video has ended. When the video has ended (YES at step S310), the reproduction process is ended, and when the video has not ended (NO at step S310), the process returns to step S302.

By the above process, it is possible to reproduce a video in which an anchor is set. Furthermore, at step S306, by performing, for example, an animation drawing process, it is possible to prevent the anchor from flickering.

According to the above embodiment, the anchor is easily edited and the data amount of anchor information is reduced.

Modification

Figure 12:
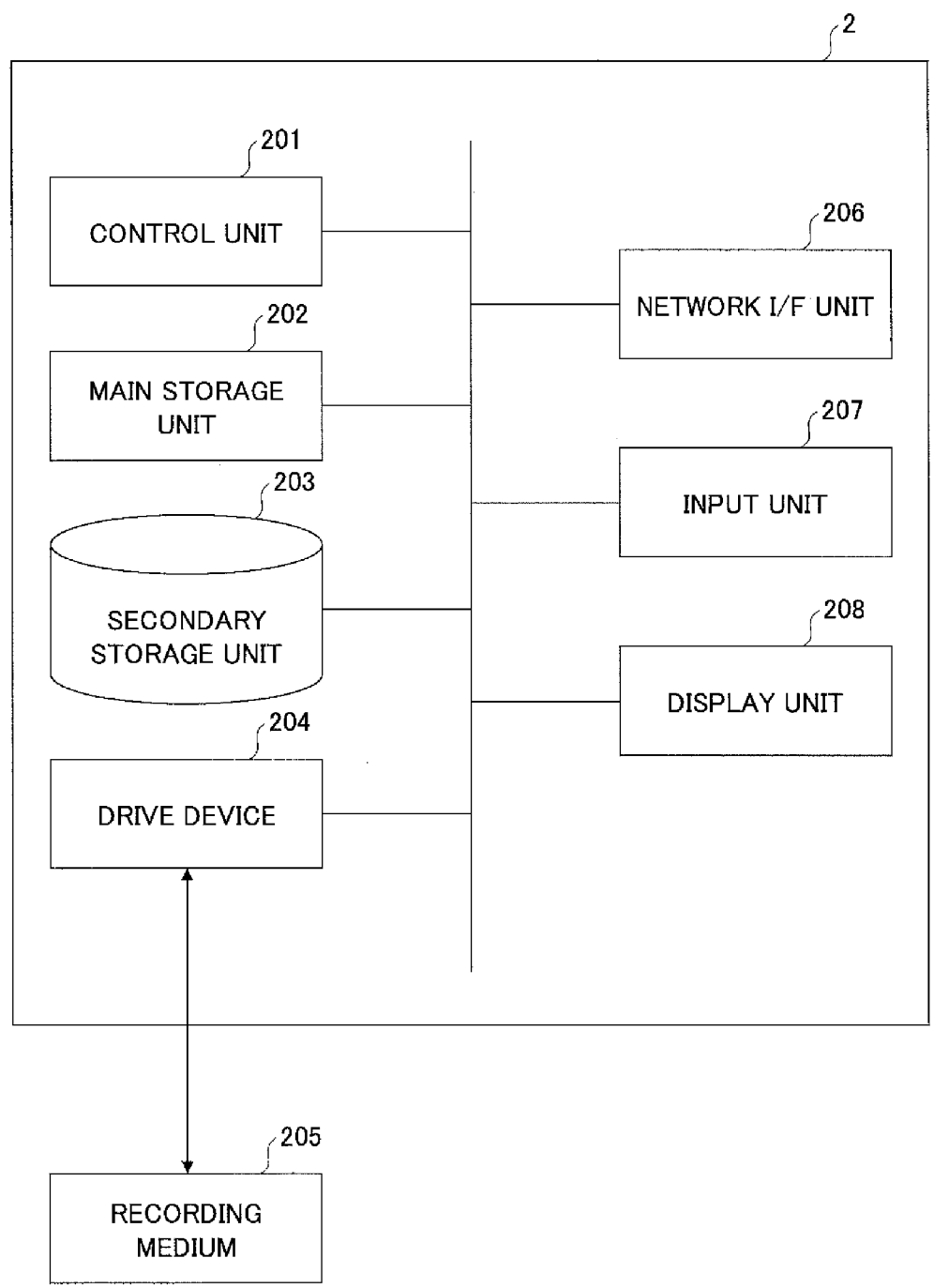
FIG. 12 is a block diagram of an example of hardware of an information processing device.

FIG. 12 is a block diagram of an example of hardware of an information processing device. As illustrated in FIG. 12, an information processing device 2 includes a control unit 201, a main storage unit 202, a secondary storage unit 203, a drive device 204, a network I/F unit 206, an input unit 207, and a display unit 208. These units are connected via a bus so that data may be exchanged among each other.

The control unit 201 is a CPU for controlling the respective devices and performing calculation and processing on the data in a computer. Furthermore, the control unit 201 is an arithmetic device for executing programs stored in the main storage unit 202 and the secondary storage unit 203. These programs are for executing information processing described in the above embodiment with reference to FIGS. 9 through 11.

The control unit 201 may realize the information processing described in the embodiment by executing these programs.

The main storage unit 202 is a ROM (Read-Only Memory) or a RAM (Random Access Memory), and is a storage device for storing or temporarily saving programs such as an OS that is the basic software and application software executed by the control unit 201 and data.

The secondary storage unit 203 is a HDD (Hard Disk Drive), and is a storage device for storing data relevant to application software.

The drive device 204 reads programs from a recording medium 205 such as a flexible disk, and installs the programs in the storage device.

Furthermore, a predetermined program is stored in the recording medium 205, and the program stored in the recording medium 205 is installed in the information processing device 2 via the drive device 204. The predetermined program that has been installed may be executed by the information processing device 2.

The network I/F unit 206 is an interface between the information processing device 2 and peripheral devices having communication functions that are connected via a network such as a LAN (Local Area Network) or a WAN (Wide Area Network) that are constituted by wired or wireless data transmission paths.

The input unit 207 includes a keyboard having cursor keys, a numeric keypad, and various function keys, and a mouse or a slice pad for selecting keys on the display screen of the display unit 208. Furthermore, the input unit 207 is a user interface for the user to give operation instructions to the control unit 201 and to input data.

The display unit 208 is a CRT (Cathode Ray Tube) or an LCD (Liquid Crystal Display), and displays information according to display data input from the control unit 201.

As described above, the image processing described in the above embodiment may be implemented as programs to be executed by a computer. By installing these programs from a server and causing a computer to execute these programs, the above information processing may be implemented.

Furthermore, the programs may be recorded in the recording medium 205, and a computer or a mobile terminal may be caused to read the recording medium 205 recording these programs to implement the above information processing. Various types of recording media may be used as the recording medium 205, including a recording medium for optically, electrically, or magnetically recording information such as a CD-ROM, a flexible disk, and a magnetic optical disk; and a semiconductor memory for electrically recording information such as a ROM and a flash memory. The recording medium does not include carrier waves. Furthermore, the information processing described in the above embodiments may be implemented by one or more integrated circuits.

For example, the above embodiment and modification may be applied to a device for creating a commentary document, an operation manual, and educational contents using videos.

According to an aspect of the embodiments, the anchor is easily edited and the data amount of anchor information is reduced.

The present invention is not limited to the specific embodiments described herein, and variations and modifications may be made without departing from the scope of the present invention.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium storing a program that causes a computer to execute a process comprising:
   receiving a setting of an anchor to a subject in an image included in a video, the anchor being an image to be displayed and superimposed on the video at a position responsive to a position of the subject when the video is displayed, the anchor being associated with a link destination that is set for the anchor;
   detecting both a first anchor position of the anchor set to the subject in a first frame in the video and a second anchor position of the anchor set to the subject in a second frame in the video, the second frame being later than the first frame in the video;
   determining whether a movement amount between the subject in the first frame in the video and the subject in the second frame in the video is greater than or equal to a predetermined value based on the detected first anchor position and the detected second anchor position; and
   storing, in a storage unit, an identifier of the second frame and position information of the anchor in the second frame such that the identifier of the second frame is associated in the storage unit with the position information of the anchor in the second frame, when the movement amount is determined to be greater than or equal to the predetermined value, and
   wherein whether the position information of the anchor in the second frame is stored in the storage unit is determined by whether the movement amount is no smaller than the predetermined value.

2. The non-transitory computer-readable recording medium according to claim 1, wherein
   when the first frame is a previous frame that is immediately before the second frame and that has not yet been selected as data to be stored in the storage unit,
   the storing further includes
      storing, in the storage unit, an identifier of the previous frame and position information of the anchor in the previous frame.

3. The non-transitory computer-readable recording medium according to claim 1, wherein the determining is performed by using the first frame that is a newest frame among frames that are storage targets to be stored in the storage unit.

4. The non-transitory computer-readable recording medium according to claim 3, wherein
   the determining includes
      determining whether an interval between the second frame and the newest frame is greater than or equal to a threshold, and
   the storing includes
      storing, in the storage unit, the identifier of the second frame and position information of the second frame, when the interval is determined to be greater than or equal to the threshold.

5. The non-transitory computer-readable recording medium according to claim 1, wherein
   when reproducing the video, when displaying a frame indicated by an identifier stored in the storage unit, the anchor is superposed at a position indicated by the position information, and when displaying a frame other than the frame indicated by the identifier stored in the storage unit, the anchor is superposed at a position obtained by performing interpolation calculation based on two position information items of the anchor corresponding to two frames positioned before and after the frame that is a display target, the two frames being included among frames indicated by identifiers stored in the storage unit.

6. The non-transitory computer-readable recording medium according to claim 1, wherein the image of the anchor moves to follow a movement of the subject in the video.

7. The non-transitory computer-readable recording medium according to claim 6, wherein the position information of the anchor is obtained in response to the position of the subject such that the image of the anchor is superimposed on the subject in the video.

8. An information processing device comprising:
- a set unit configured to set an anchor to a subject in an image included in a video, the anchor being an image to be displayed and superimposed on the video at a position responsive to a position of the subject when the video is displayed, the anchor being associated with a link destination that is set for the anchor;
- a unit configured to detect both a first anchor position of the anchor set to the subject in a first frame in the video and a second anchor position of the anchor set to the subject in a second frame in the video, the second frame being later than the first frame in the video;
- a determine unit configured to determine whether a movement amount between the subject in the first frame in the video and the subject in the second frame in the video is greater than or equal to a predetermined value based on the detected first anchor position and the detected second anchor position; and
- a storage unit configured to store an identifier of the second frame and position information of the anchor in the second frame such that the identifier of the second frame is associated in the storage unit with the position information of the anchor in the second frame, when the movement amount is determined to be greater than or equal to the predetermined value, and wherein whether the position information of the anchor in the second frame is stored in the storage unit is determined by whether the movement amount is no smaller than the predetermined value.

9. A method for processing information executed by a computer, the method comprising:

receiving a setting of an anchor to a subject in an image included in a video, the anchor being an image to be displayed and superimposed on the video at a position responsive to a position of the subject when the video is displayed, the anchor being associated with a link destination that is set for the anchor;

detecting both a first anchor position of the anchor set to the subject in a first frame in the video and a second anchor position of the anchor set to the subject in a second frame in the video, the second frame being later than the first frame in the video;

determining whether a movement amount between the subject in the first frame in the video and the subject in the second frame in the video is greater than or equal to a predetermined value based on the detected first anchor position and the detected second anchor position; and storing, in a storage unit, an identifier of the second frame and position information of the anchor in the second frame such that the identifier of the second frame is associated in the storage unit with the position information of the anchor in the second frame, when the movement amount is determined to be greater than or equal to the predetermined value, and wherein whether the position information of the anchor in the second frame is stored in the storage unit is determined by whether the movement amount is no smaller than the predetermined value.

* * * * *